Oct. 25, 1932.  W. A. ROSS  1,884,874
PIPE JOINT COUPLING DEVICE
Filed April 13, 1927   3 Sheets-Sheet 1
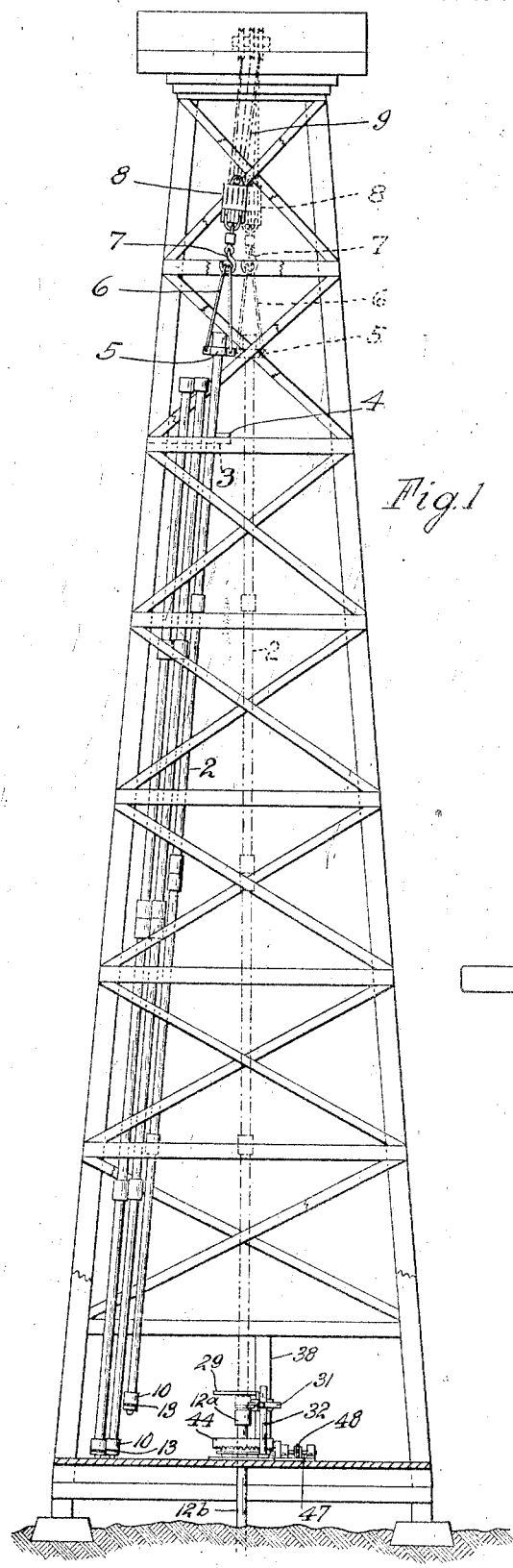
Fig.1
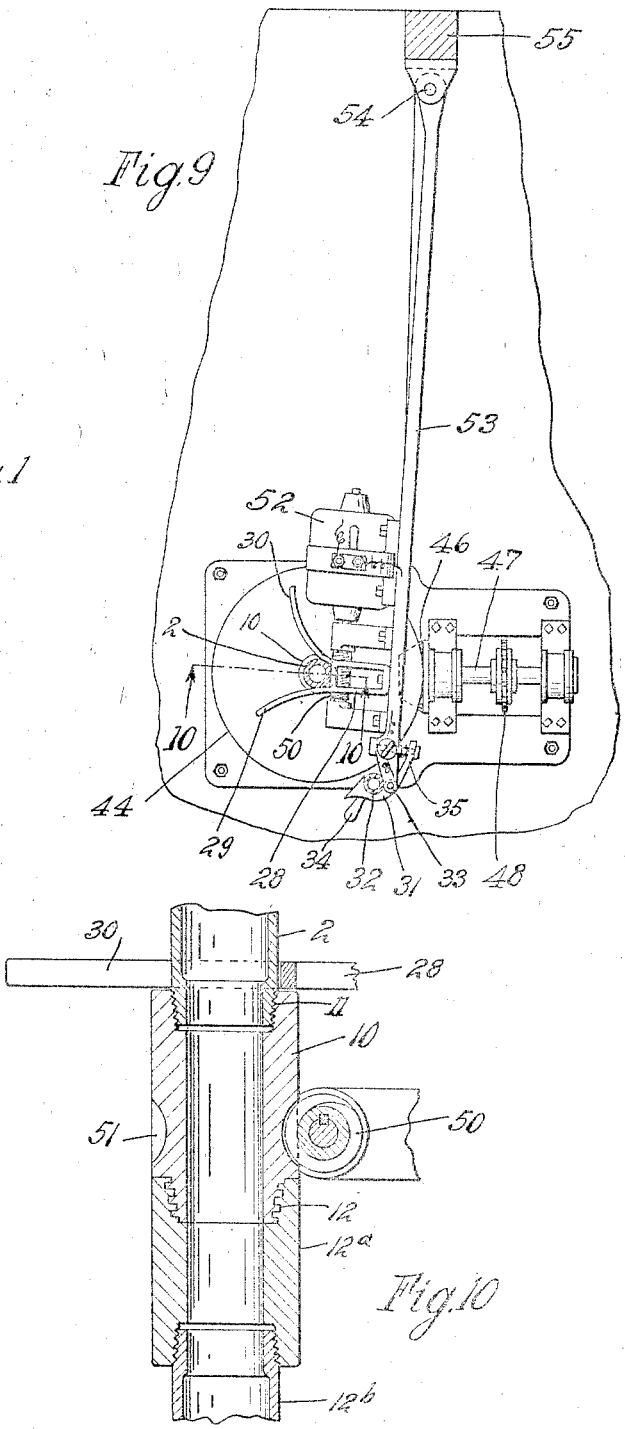
Fig.9
Fig.10
Inventor
Warren A. Ross
by Parker & Carter
Attorneys

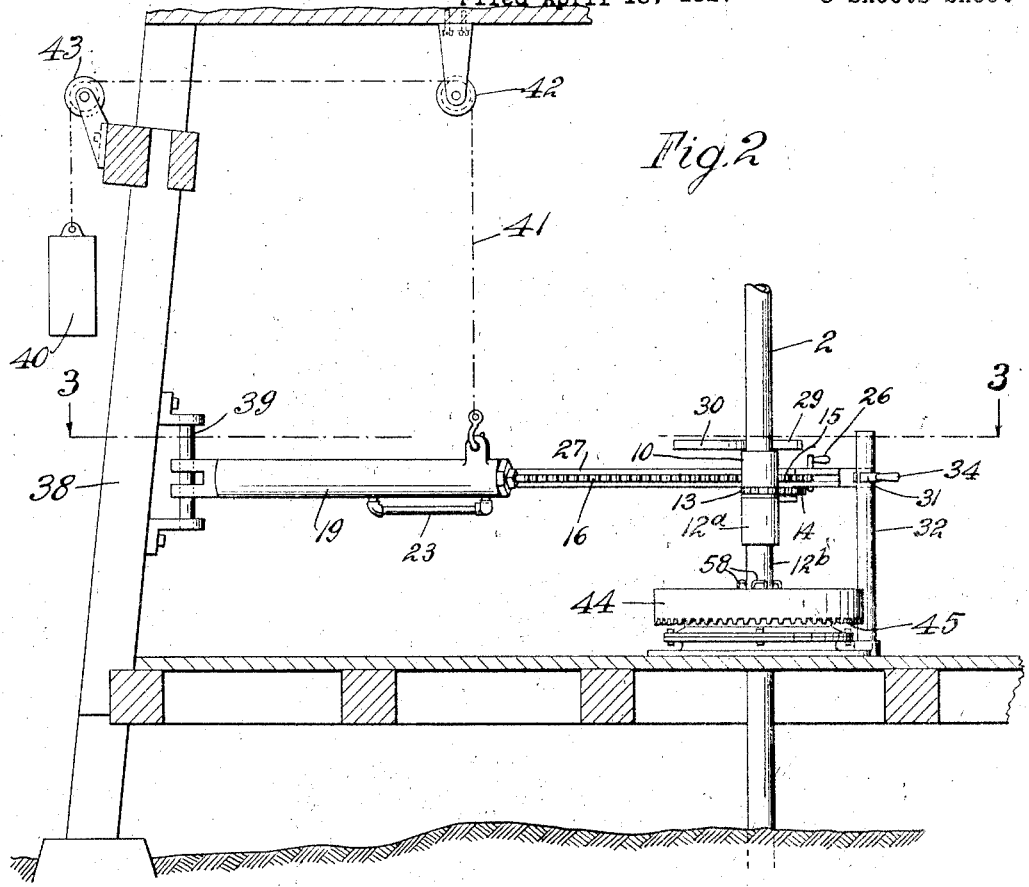
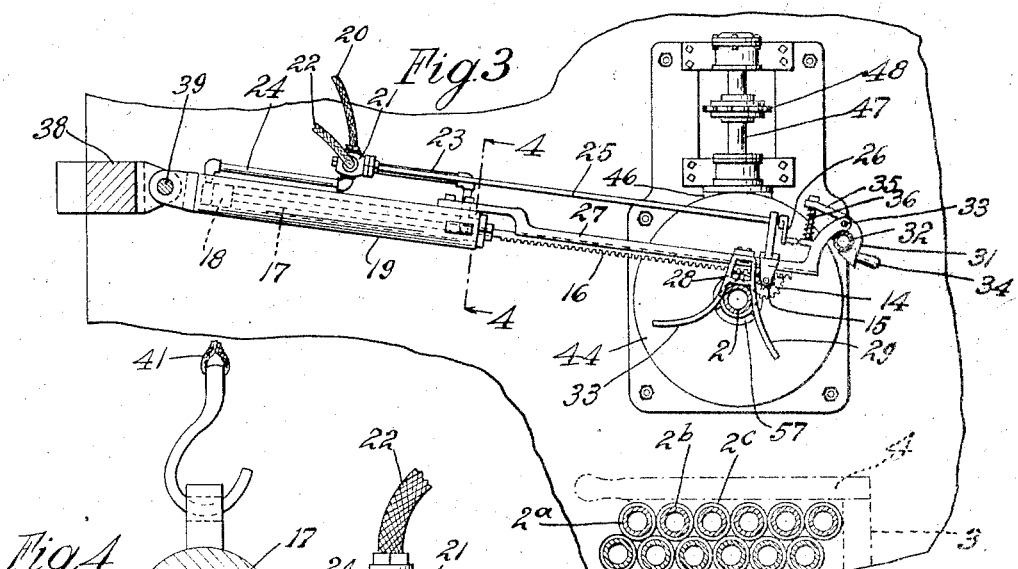
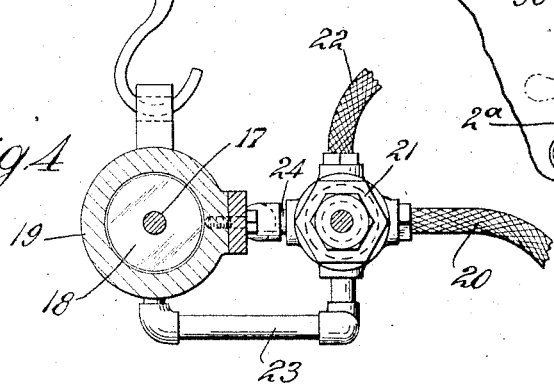

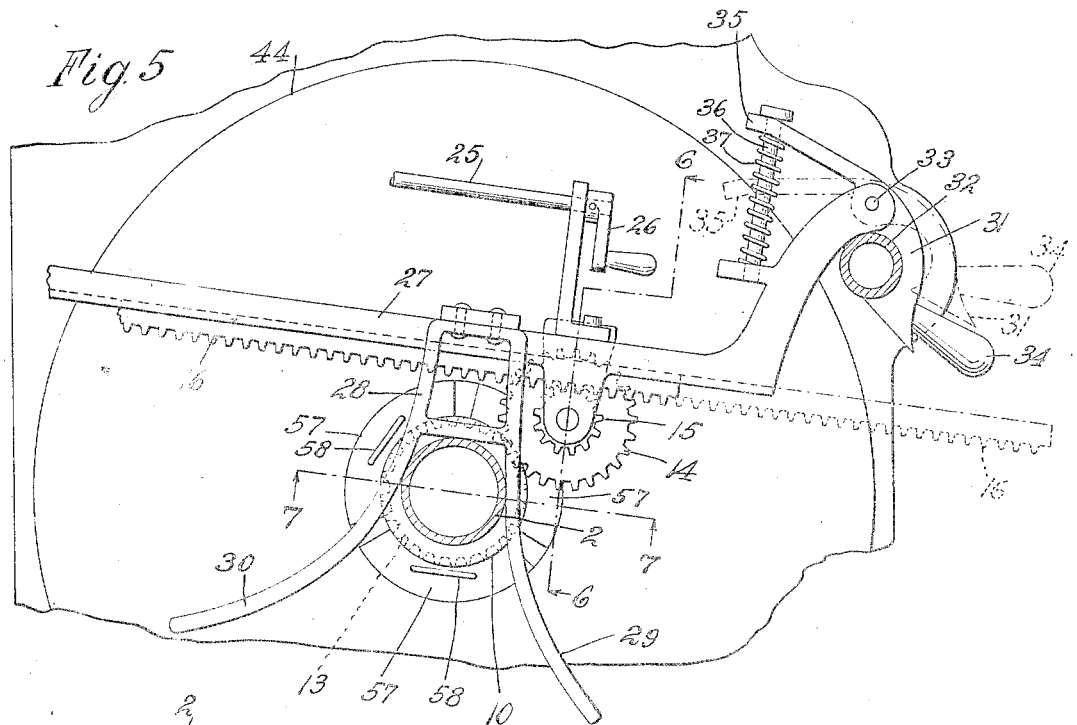
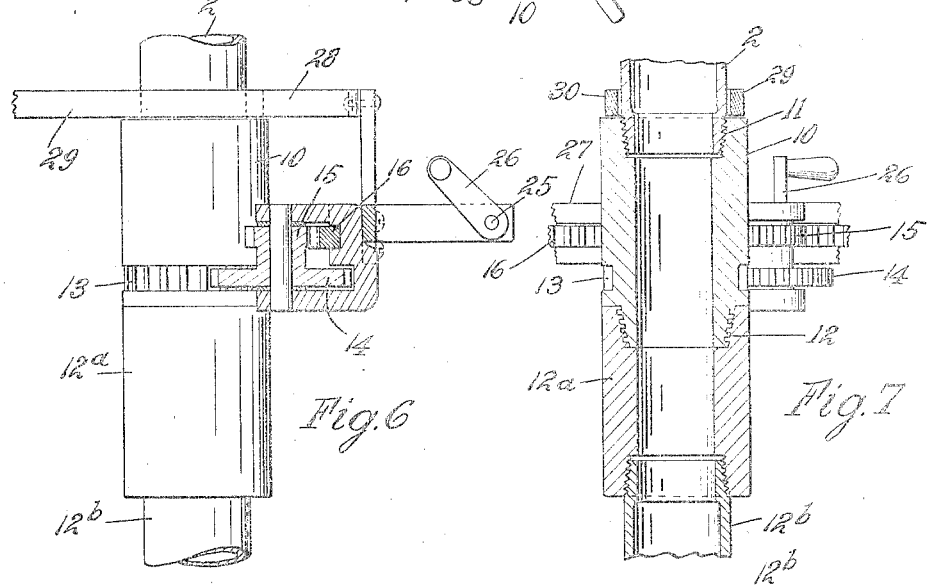
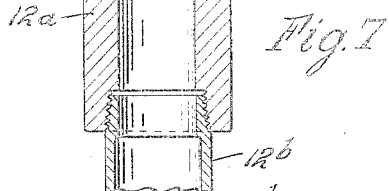
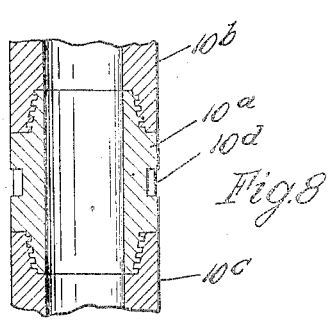
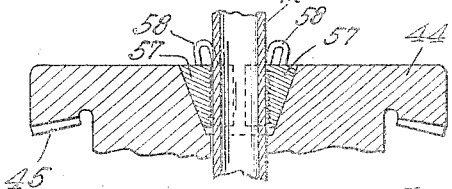

Patented Oct. 25, 1932

1,884,874

UNITED STATES PATENT OFFICE

WARREN A. ROSS, OF LONG BEACH, CALIFORNIA, ASSIGNOR OF ONE-FOURTH TO TRUMAN O. BOYD, OF LONG BEACH, CALIFORNIA, AND ONE-FOURTH TO DONALD M. CARTER, OF CHICAGO, ILLINOIS

PIPE JOINT COUPLING DEVICE

Application filed April 13, 1927. Serial No. 183,571.

This invention relates to joint coupling devices for pipes and the like and has for its object to provide a new and improved device of this description.

The invention has as a further object to provide a quick, reliable, safe and efficient means for coupling sections of pipe and the like together. The present practice for coupling or uncoupling sections of drill pipe in the field is to use some form of pipe wrench. Coupling and uncoupling the sections by this means is a slow and difficult as well as a dangerous operation.

The invention has as a further object to provide an apparatus particularly adapted for coupling and uncoupling sections of oil drill pipes in the field.

The invention has other objects which are more particularly pointed out in the accompanying description.

Referring now to the drawings.

Fig. 1 is a view showing one form of the joint coupling apparatus as applied to the drill pipes of an oil well.

Fig. 2 is an enlarged view in part section showing the coupling apparatus.

Fig. 3 is a view taken on line 3—3 of Fig. 2.

Fig. 4 is an enlarged sectional view taken on line 4—4 of Fig. 3.

Fig. 5 is an enlarged view of a portion of coupling apparatus.

Fig. 6 is a sectional view taken on line 6—6 of Fig. 5.

Fig. 7 is a sectional view taken on line 7—7 of Fig. 5.

Fig. 8 is a view showing a modified coupling.

Fig. 9 is a view showing a further modified construction.

Fig. 10 is an enlarged sectional view taken on line 10—10 of Fig. 9.

Fig. 11 is a sectional view through the center of the driving member.

Like numerals refer to like parts throughout the several figures.

Referring now to the drawings, I have illustrated in Fig. 1 a derrick of the kind used for drilling wells such as oil wells with the joint coupling apparatus in position to couple or uncouple the joints of the drill pipe as the drill pipe is lowered or raised.

The drill pipe may be arranged in a series of lengths 2, $2^a$, $2^b$, $2^c$, etc. ready to be coupled together or single sections may be used. In Fig. 1 I have shown a series of these lengths of the pipe arranged so as to be easily accessible. These pipe lengths are held in their proper position by the supports 3 and 4 and they are brought, one at a time, into proper position to be connected with the drill pipe in the well. Any means for bringing them in position may be used as herein shown.

As herein shown, I provide a crank 5 having a connecting piece 6 which is connected to the hook 7 of the pulley 8 over which passes the cables 9. It will be seen that by this means the pipe lengths to be coupled may be suspended and moved to the proper coupling position.

The sections of pipe are coupled together by coupling pieces. In Figs. 6 and 7 I have shown one form of such coupling pieces consisting of the piece 10 which has at its opposite ends screw threads 11 and 12 by means of which it is connected to the adjacent parts. With this construction I prefer to provide a connecting piece $12^a$ which connects with the other section of the pipe $12^b$ and with section 10 which connects with the pipe section 2.

The coupling piece 10 is provided on its periphery with a series of teeth 13. When the apparatus is in position these teeth are engaged by a toothed engaging part 14 provided with means for rotating it in either direction so as to connect or disconnect the coupling pieces with the adjacent parts. Any suitable means is provided for rotating this toothed engaging part.

As shown in Figs. 6 and 7, the toothed engaging part 14 is provided with a pinion 15 which when rotated rotates the part 14. The pinion 15 is engaged by a rack 16, and means is provided for moving this rack in either direction to rotate the pinion in either direction. I prefer to provide some power actuated means for moving the toothed engaging part 14. In Figs. 1 to 4 I have illustrated such a device. In this construction the rack 16 is connected with a rod 17, which is connected to a piston 18 (see Fig. 4) of a power cylinder 19. Air, steam, or the like is supplied to the power cylinder through a suitable pipe 20 connected to a source of supply. This pipe leads to a valve 21 arranged to admit the power fluid on either side of the piston and also permit the exhaust of the power fluid from the piston through the pipe 22. The valve 21 is connected to cylinder on one side of the piston by the pipe 23 and to the cylinder on the other side of the piston by the pipe 24. The valve 21 is actuated by an actuating member 25 consisting in this case of a rotatable rod rotated by means of the crank 26.

The rack 16 works in the guiding member 27 connected with the cylinder 19 and which has the pipe engaging member 28 provided with the spreading centering members 29 and 30 which are separated at their ends so that the pipe section may be easily inserted between them and then converge so as to bring the pipe section to a proper position with relation to the toothed engaging part 14 and hold it in such position. The members 29 and 30 are in a different plane from the toothed engaging part 14 and in the construction shown in Figs. 1 to 7 are shown surrounding the pipe above the coupling section 10.

The guiding member 27 is provided with a holding device 31 adapted to engage a post 32 so as to hold the parts in proper position with relation to the pipe section 12$^b$ with which the pipe section 2 is to be connected. The holding piece 31 is pivoted at 33 to the guide 27 and is provided with a handle 34. The end 35 of engaging device 31 is provided with an opening and slides around a rod 36. A spring 37 engages the end 35 so as to normally hold the holding piece in its holding position. By means of this construction when the guiding member 27 is moved toward the post 32 the holding piece 31, when it engages the post, is moved about the pivot 33 until the post is in the position shown in Figs. 3 and 5, and the spring 37 then moves the holding piece to the position shown in these figures. By this construction the connection between the guide member 27 and the post is made automatically and the disconnection is made by moving the handle 34.

The toothed engaging part 14 and associated parts are preferably arranged so that they may be easily moved out of the way when not in use and then moved to the position shown in Figs. 2, 3 and 5 when a coupling or uncoupling is to be made. This result is secured in the construction shown by having the part with which the toothed engaging part is connected pivotally mounted. In the construction shown in Figs. 1 to 3 this result is secured by having the cylinder 19 pivotally connected with a support 38 (see Fig. 2) by means of the pivot 39. This pivot is elongated so that the cylinder 19 may be moved up or down so that the toothed engaging part may engage the teeth on the pipe coupling, when these teeth are in different positions vertically, thereby making it unnecessary to have the teeth in any exact or particular position when the coupling is being made.

The cylinder and associated parts are preferably counterbalanced by a counterweight 40 which is connected to the device by means of a flexible connecting piece 41 passing over the pulleys 42 and 43. It will thus be seen that this gives a perfect control over the apparatus.

In the construction shown the post 32 is located in proper position with relation to the drill pipe driving member 44 through which the drill pipe is inserted into the well. This driving member is driven in any of the usual ways as by means of teeth 45 engaged by a pinion 46 on the shaft 47 driven from any suitable source of power through the agency of the sprocket wheel 48.

In Figs. 9 and 10 I have shown a modified construction. In this construction the toothed engaging part 50 is shown as a worm, the teeth of which engage similar worm teeth 51 on the coupling piece 10. The worm 50 is driven in any suitable manner as by means of a motor 52 mounted on an arm 53 pivoted at 54 to a support 55. This arm is provided with the holding piece 31 and associated parts arranged as shown in connection with the guiding member 27.

In Fig. 8 I have shown a construction wherein the coupling piece 10$^a$ is arranged so as to be flush with the pipe section 10$^b$ and the piece 10$^c$. This coupling piece is provided with the teeth 10$^d$.

Some means, of course, is provided for holding the portion of the pipe which is in the well so that its upper end will be in the proper position. Any suitable means for this purpose may be used. As shown in Fig. 11, the pipe is held by means of the wedges 57 located in the opening in the driving member 44. There are several of these wedges and they have roughened surfaces which engage the pipe. These wedges are provided with handles 58 so that they may be easily handled.

The use and operation of my invention are as follows.

When oil wells are being drilled, it is necessary to often remove the entire drill pipe from the well and then again insert it. When the drill pipe is thus removed from the well it must be disconnected in lengths depending upon the height of the derrick. When the drill pipe is again lowered into the well, these lengths must be connected together.

By means of my invention, much time is saved in disconnecting and connecting these lengths together. My device may be used in connecting and disconnecting the sections of the drill pipe during the ordinary process or connecting and disconnecting these lengths when the entire drill pipe is removed and inserted in the well. It may, of course, be used for any other purpose for which it is adapted. When the drill pipe is removed from the well, the lengths of pipe 2, 2a, 2b, 2c etc., are conveniently arranged as shown in Figs. 1 and 3. When it is desired to connect a new length of pipe with the pipe in the well, one of the lengths of pipe as, for example, the length 2, is connected with the pulley 8 as shown in Fig. 1 and moved out at the rear end of the support 4 and brought into the position shown in dotted lines in Fig. 1.

The guiding member 27 is moved over and connected with the post 32 as shown in Figs. 2, 3 and 5 and the pipe section 2 moved in between the members 29 and 30 and the connecting piece 10 brought into engagement with the toothed engaging part 14. The handle 26 is then turned to admit the power fluid in the rear of the piston 18 and this piston is moved outwardly so as to move the rack 16 to rotate the toothed engaging part 14. The rotation of this part by its engagement with the teeth 13 on the coupling piece 10 causes the coupling piece to rotate so as to connect it with the pipe section 12b. As herein shown the coupling piece 10 is connected with the end of the length of pipe 2 and the piece 10 and the length of pipe 2 will be rotated by the engaging part 14, while the connection is being made. The pipe is then lowered until the upper end of length 2 is in proper position, that is, is in the position of the section 12b in Fig. 2. The guiding device 27 and associated parts are moved to one side so as to be out of the way and the next length of pipe 2a is then connected to it in the manner above described. This process is continued until the lower end of the pipe reaches the bottom of the well. When the drill pipe is removed from the well, the sections are disconnected by moving the handle 26 in the opposite direction to admit power fluid in the other end of the cylinder 19 so as to rotate the connecting piece 10 in the opposite direction.

When it is remembered that these wells are very deep, in some instances over a mile deep, the moving of the drill pipe out of the hole and back into the hole is a difficult task and takes a long time and this device greatly reduces the difficulty presented and the time required. It is desirable to have some power actuated device to move the rack and tooth part due to the fact that when the device is in use, the drill pipe is rotated and in view of the great weight of the long portion of pipe and the resistance opposing movement by the drill, the screw thread joints are tightened up to a very high degree and are exceedingly difficult to loosen.

With my present device, however, these joints can be very easily and quickly screwed. The device may also be used to connect the pipe sections together during the drilling process.

If the device is to be used at other places than at the well, it will be operated in a similar manner.

It will be seen that by means of this apparatus the lengths or sections of pipe, rods, or other pieces, may be easily, quickly and safely connected and disconnected and that when the device is used in connection with oil well apparatus, it not only insures safety and prevents injury to the parts, but saves a large amount of time and expense in coupling and uncoupling drill pipe lengths and sections.

I claim:

1. A joint coupling device comprising a guiding member, a rack connected therewith, a toothed part operatively connected with said rack and adapted to engage teeth on the joint connecting member which is to be coupled and uncoupled, means for positioning and holding the guiding member in proper relation to one portion of the device to be joined, a holding device for holding the other part of the device to be joined and means for moving said rack so as to rotate said toothed part to couple or uncouple it.

2. A joint coupling and uncoupling device comprising a toothed part adapted to be brought into engagement with teeth on the joint to be acted upon, a movable member with which said toothed part is movably connected, said member adjustable longitudinally of the joint, means for holding said movable member in position to bring the teeth of said movable part into operative relation with the teeth of the joint to be acted upon, and driving means operatively connected with said toothed part.

3. A joint coupling and uncoupling device for coupling and uncoupling jointed devices having teeth on the joints to lengthen and shorten them comprising a toothed part for engaging teeth on the joints to be acted upon, a movable member upon which said toothed part is rotatably mounted, a power actuated driving device connected with said movable member and operatively connected with said toothed part, said toothed part adapted to be brought into engagement with the teeth on the joint and rotated with relation to the other portion of the joint, to couple and uncouple said joints.

4. A joint coupling and uncoupling device comprising a toothed part adapted to be brought into operative engagement with teeth on the joint to be acted upon, a movable member with which said toothed part is rotatably connected, a pivot about which said member moves, a holding piece for holding said toothed part in operative relation to the teeth on said joint and means for rotating said movable part when in its operative position.

5. A joint coupling and uncoupling device comprising a toothed part adapted to be brought into operative engagement with teeth on the joint to be acted upon, a movable member with which said toothed part is rotatably connected, a pivot about which said member moves, said member adapted to be moved longitudinally along said pivot to properly position it with relation to the teeth on said joint.

6. A joint coupling and uncoupling device comprising a toothed part adapted to be operatively connected with teeth on the joint to be acted upon, a movable member with which said toothed part is movably connected, said member adapted to be moved horizontally and to be moved vertically into different horizontal planes, means for holding said member in any of said horizontal planes into which it is moved and means for holding said toothed part in operative relation with the teeth on the joint to be acted upon.

7. A joint coupling and uncoupling device for coupling and uncoupling jointed devices having joints at intervals comprising two separable portions, said uncoupling device comprising a holding device for holding a portion of the joint against rotation, a toothed part separate from the parts to be coupled and adapted to engage teeth on the other portion of the joint to be acted upon and means for moving said toothed part with relation to the portion of the joint with which it engages while the other part is held against rotation, to couple or uncouple the joint.

8. A coupling and uncoupling device for tool joints having separable sections comprising a series of teeth forming a part of one section of said joint, a movable toothed part separate from the parts to be coupled and having teeth to successively mesh with the teeth of said toothed section by means of which said toothed section may be rotated to connect and disconnect the sections.

Signed at Chicago, county of Cook and State of Illinois, this sixth day of April, 1927.

WARREN A. ROSS.